(12) United States Patent
Moulsley

(10) Patent No.: US 6,738,638 B1
(45) Date of Patent: May 18, 2004

(54) RADIO COMMUNICATION SYSTEM

(75) Inventor: Timothy J. Moulsley, Caterham (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 453 days.

(21) Appl. No.: 09/602,244

(22) Filed: Jun. 23, 2000

(30) Foreign Application Priority Data

Jun. 26, 1999 (GB) .............................................. 9914926

(51) Int. Cl.[7] .................................................. H04Q 7/20
(52) U.S. Cl. .................... 455/517; 455/452.1; 455/522; 455/509; 455/69; 370/348; 370/445
(58) Field of Search .............................. 455/517, 522, 455/69, 450, 452.1, 455, 434, 509; 370/348, 461, 462, 445–448

(56) References Cited

U.S. PATENT DOCUMENTS

| | | | | |
|---|---|---|---|---|
| 4,774,707 A | * | 9/1988 | Raychaudhuri | 370/447 |
| 5,166,929 A | * | 11/1992 | Lo | 370/448 |
| 5,673,259 A | * | 9/1997 | Quick, Jr. | 370/342 |
| 5,892,769 A | * | 4/1999 | Lee | 370/447 |
| 6,157,616 A | * | 12/2000 | Whitehead | 370/252 |
| 6,169,759 B1 | * | 1/2001 | Kanterakis et al. | 375/130 |
| 6,256,301 B1 | * | 7/2001 | Tiedemann et al. | 370/342 |
| 6,310,868 B2 | * | 10/2001 | Uebayashi et al. | 370/335 |
| 6,366,779 B1 | * | 4/2002 | Bender et al. | 455/450 |
| 6,519,469 B1 | * | 2/2003 | Rydnell et al. | 455/466 |
| 6,587,453 B1 | * | 7/2003 | Romans et al. | 370/347 |
| 6,606,313 B1 | * | 8/2003 | Dahlman et al. | 370/347 |
| 6,625,162 B2 | * | 9/2003 | Myojo et al. | 370/445 |
| 6,674,765 B1 | * | 1/2004 | Chuah et al. | 370/458 |

* cited by examiner

*Primary Examiner*—William Trost
*Assistant Examiner*—Sharad Rampuria
(74) *Attorney, Agent, or Firm*—Jack D. Slobod

(57) ABSTRACT

The invention relates to a radio communication system having a random access packet channel for the transmission of data packets (214) from a secondary station to a primary station. Such a channel is intended for use by secondary stations having packets of data (214) to transmit to a primary station while not actually engaged in a call. A secondary station wishing to transmit data packets (214) engages in two contention resolution phases (208, 210) with the primary station. This addresses the problem with prior art systems that there is a significant chance of two secondary stations believing that they have been granted access to the channel, the resultant collisions leading to a significant reduction in system capacity.

20 Claims, 3 Drawing Sheets

RADIO COMMUNICATION SYSTEM

The present invention relates to a radio communication system having a random access channel for the transmission of data from a secondary station to a primary station, and further relates to primary and secondary stations for use in such a system and to a method of operating such a system. While the present specification describes a system with particular reference to the emerging Universal Mobile Telecommunication System (UMTS), it is to be understood that the techniques described are equally applicable to use in other mobile radio systems. In this specification the term random access channel refers to the logical channel on which random access transmissions take place, which would typically consist of a number of distinct physical channels.

A random access channel is a normal component of a radio communication system, enabling a Mobile Station (MS) to send short messages to a Base Station (BS). Applications include signalling to the BS when the MS is turned on, sending a packet of data to the BS when the MS is not engaged in a call, and requesting the BS to allocate a resource for the MS to use.

In a system where mobile stations often have a requirement to send packets of data to the BS when not actually engaged in a call it is advantageous to provide a random access packet channel with similar characteristics to a standard random access channel but intended for the transmission of small and medium sized packets from a MS to the BS. Because of the random access nature of the channel, it is possible that two (or more) mobile stations attempt to send data packets simultaneously, leading to a high probability of data loss. The result of this collision is significant delay, as well as increased interference and loss of capacity.

An embodiment of a random access packet channel, developed for UMTS, employs a contention resolution method when a MS attempts to gain access to the packet channel. However, even using this method there is still a significant chance of unresolved collisions leading to significant reduction in system capacity.

An object of the present invention is to provide improved contention resolution.

According to a first aspect of the present invention there is provided a radio communication system comprising a primary station and a plurality of secondary stations and having a random access channel for the transmission of data from a secondary station to the primary station, the primary and secondary stations having means for engaging in an access phase, comprising the secondary station transmitting an access preamble encoded with a first signature and the primary station transmitting an access acknowledgement, the primary and secondary stations also having means for engaging in a first contention resolution phase on completion of the access phase, characterised in that the primary and secondary stations have means for engaging in a second contention resolution phase for at least some choices of the first signature, the primary station having means for granting the secondary station access to the random access channel on completion of the final contention resolution phase and the secondary station having means for transmitting data on the random access channel when it is granted access.

According to a second aspect of the present invention there is provided a primary station for use in a radio communication system having a random access channel for the transmission of data from a secondary station to the primary station, the primary station having means for engaging in an access phase, comprising the secondary station transmitting an access preamble encoded with a first signature and the primary station transmitting an access acknowledgement, and also having means for engaging in a first contention resolution phase on completion of the access phase, characterised in that means are provided for engaging in a second contention resolution phase for at least some choices of the first signature, and means are provided for granting the secondary station access to the random access channel on completion of the final contention resolution phase.

According to a third aspect of the present invention there is provided a secondary station for use in a radio communication system having a random access channel for the transmission of data to a primary station, the secondary station having means for engaging in an access phase, comprising the secondary station transmitting an access preamble encoded with a first signature and the primary station transmitting an access acknowledgement, the secondary station also having means for engaging in a first contention resolution phase on completion of the access phase, characterised in that means are provided for engaging in a second contention resolution phase for at least some choices of the first signature, the primary station having means for granting the secondary station access to the random access channel on completion of the final contention resolution phases and means are provided for transmitting data on the random access channel when access is granted by the primary station on completion of the contention resolution phase.

According to a fourth aspect of the present invention there is provided a method of operating a radio communication system having a random access channel for the transmission of data from a secondary station to a primary station, the method comprising the primary and secondary stations engaging in an access phase, comprising the secondary station transmitting an access preamble encoded with a first signature and the primary station transmitting an access acknowledgement, the method further comprising the primary and secondary stations engaging in a first contention resolution phase on completion of the access phase, characterised by the primary and secondary stations engaging in a second contention resolution phase for at least some choices of the first signature, the primary station granting the secondary station access to the random access channel on completion of the final contention resolution phase and the secondary station transmitting data on the random access channel when it is granted access.

Embodiments of the present invention will now be described, by way of example, with reference to the accompanying drawings, wherein.

In the drawings the same reference numerals have been used to indicate corresponding features.

Figure 1:
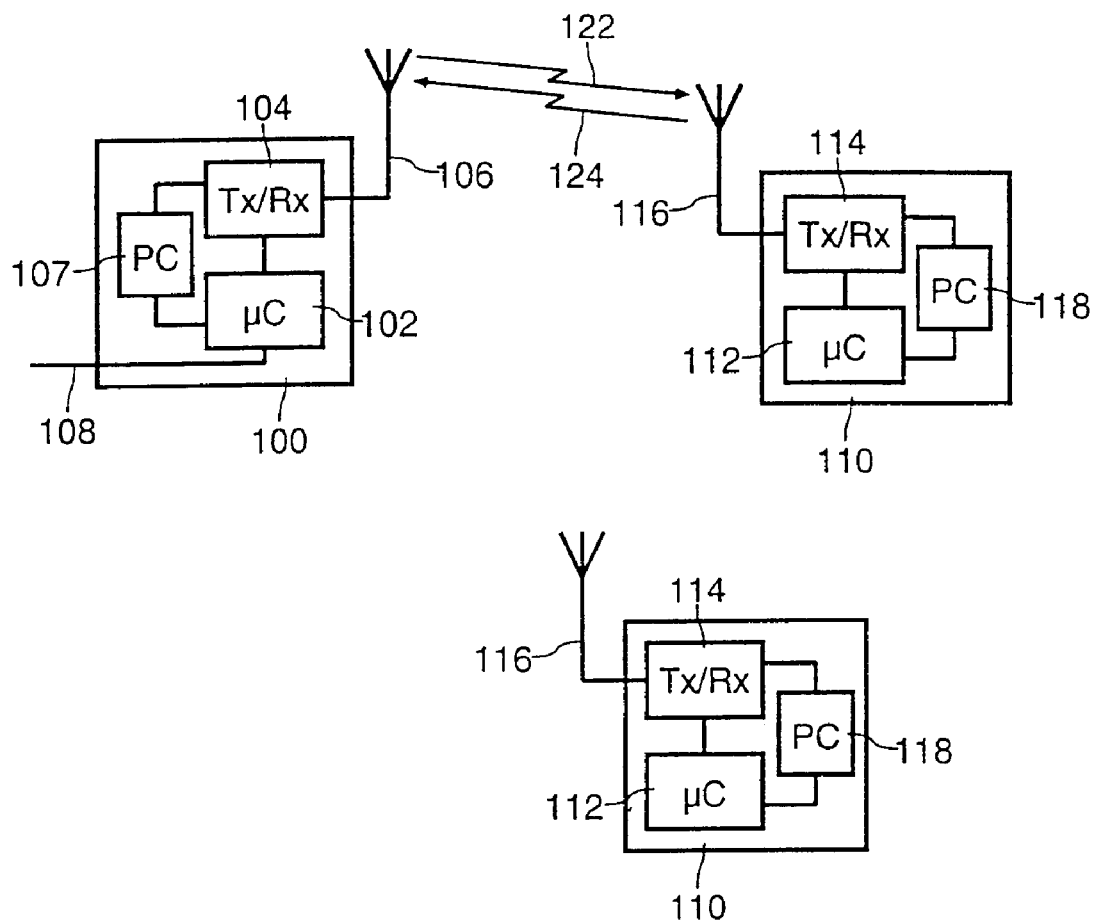
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller ($\mu$C) 102, transceiver means (Tx/Rx) 104 connected to radio transmission means 106, power control means (PC) 107 for altering the transmitted power level, and connection means 108 for connection to the PSTN or other suitable network. Each MS 110 comprises a microcontroller (μC) 112, transceiver means (Tx/Rx) 114 connected to radio transmission means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
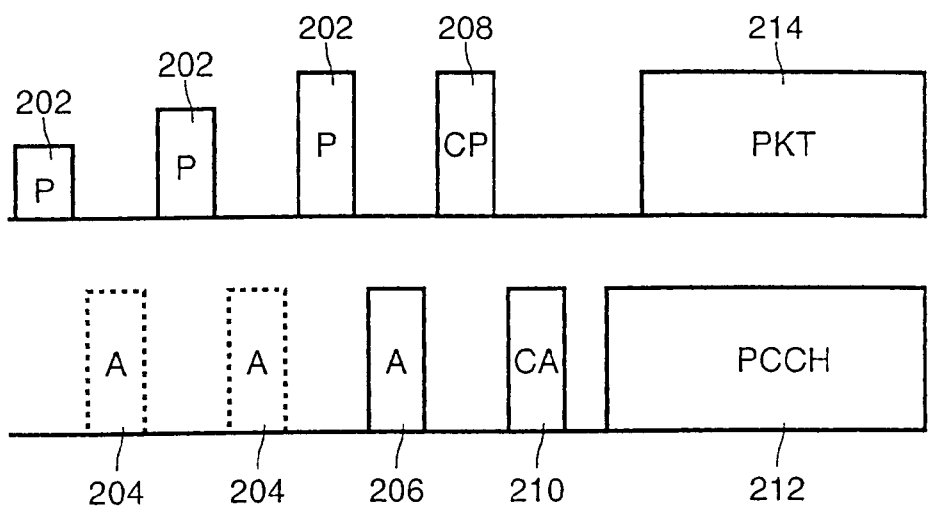
FIG. 2 illustrates a basic random access packet channel scheme providing contention resolution.

A basic scheme for a random access packet channel operating in a frequency division duplex system is shown in FIG. 2, with the uplink channel 124 drawn above the downlink channel 122. In an access phase, the MS 110 first transmits a preamble (P) 202, encoded with a signature randomly chosen from a set of 16 possible signatures, at a low power level in a particular access slot. A signature is a signal characterised by its scrambling code and channelisation code modulated by a specific bit sequence. A mutually orthogonal set of signatures can be obtained by defining a set of mutually orthogonal bit sequences for the modulation. Hence, a different set of signatures can be obtained by changing the scrambling code or the channelisation code (i.e. the physical channel), or by using a different mutually orthogonal set of bit sequences. Alternatively a larger set of signatures may be defined in such a way as to have low cross correlations, rather than strict orthogonality.

In some systems, the choice of preamble signature for encoding the access preamble 202 may not be completely random. Instead, there could be a mapping between the preamble signature used and the resource requested for data transmission, to reduce the need for further signalling. For example, if there are 4 physical channels available for the transmission of packet data the set of 16 signatures could be subdivided into 4 groups, each corresponding to a different physical channel. Within a group of signatures the choice should still be random. In general the mapping between signatures and physical channels could by one to one or many to one. Further, although the present specification refers to sets of 16 signatures different implementations may use sets having different numbers of signatures. Similarly, there is no requirement that different sets of signatures contain the same number of signatures.

If the BS 100 receives and decodes the preamble correctly it transmits a preamble acknowledgement (A) 206. In the example shown in FIG. 2, after the first preamble 202 is transmitted no acknowledgement is returned in the slot 204 allocated for it (which might typically be 1 ms in length). The MS 110 therefore transmits another preamble 202 at a higher power level. Again no acknowledgement is received in the slot 204, so the MS 110 transmits another preamble 202 at a still higher power. This is received and decoded by the BS 100, which transmits an acknowledgement 206 and thereby completes the access phase.

The BS 100 will only transmit one acknowledgement for each access slot, for the preamble 202 received with the highest power, however many preambles 202 were transmitted. If more than one preamble 202 was transmitted but each preamble was encoded with a different signature then each MS 110 will know whether or not its preamble 202 was received correctly. However, it is possible that more than one MS 110 selected the same signature, and therefore believes that its preamble 202 has been received. If each of these mobile stations 110 begins to transmit its data the result will be a collision, with none of the data likely to be received correctly.

To reduce the chances of this happening, a contention resolution phase follows the transmission of the acknowledgement 206. Each MS 110 which transmitted a preamble 202 encoded with a signature corresponding to that acknowledged by the BS 100 now transmits a further contention resolution preamble (CP) 208. This preamble 208 is encoded with a signature randomly selected from another set of 16 possible signatures. This set may be different from the set used for the access preamble 202 (either by changing the set of modulating bit sequences, the scrambling code or the channelisation code), or alternatively the set of signatures may be shared between access and contention resolution phases. The BS 100 then issues a contention resolution acknowledgement (CA) 210 corresponding to the preamble 208 received with the highest power, which acknowledgement 210 enables the MS 110 to transmit its data. Hence, if more than one MS 110 selected the same access preamble 202 the chance of the same contention resolution preamble 208 also being selected is small.

After this contention resolution phase the BS 100 begins transmission of a Physical Control CHannel (PCCH) 212, which includes power control information to instruct the MS 110 to adjust its transmission power as necessary, and the MS 110 transmits one or more data packets (PKT) 214, normally on a different physical channel to those used for the preamble transmissions. The PCCH 212 may begin simultaneously with the transmission of the data 214, or may precede it sufficiently for closed loop power control to be established before the data transmission.

Although the contention resolution phase reduces the chances of more than one MS 110 attempting to transmit data packets 214 simultaneously it may fail. If it does, the simultaneous transmission of data packets 214 will give rise to a high probability of data loss. Although such data loss can be detected and handled within a UMTS system, the result is a significant delay in the data transmissions concerned, increased interference levels and reduced system capacity.

The random access packet channel has a limited capacity. In a system with high traffic loading it is therefore likely that more than one MS 110 will be waiting for capacity to become available. In such a situation there is a significant chance of a collision when the capacity does become available, possibly approaching 100%. The contention resolution phase described above, with 16 signatures available, should reduce the probability of an unresolved collision to less than 1 in 16. However, because of the negative effects if a collision does take place, there could still be a significant reduction in system capacity as a result. Therefore an improved contention resolution method is desirable.

Figure 3:
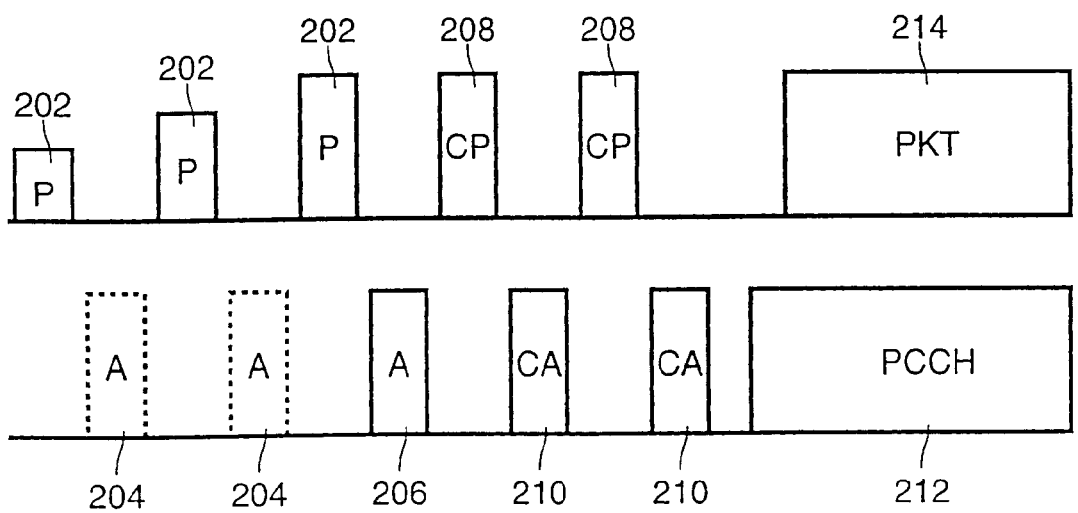
FIG. 3 illustrates a random access packet channel scheme providing improved contention resolution in accordance with the present invention.

A scheme for a random access packet channel incorporating such an improved contention resolution method, in accordance with the present invention, is shown in FIG. 3. The operation of this scheme is identical to that described above in relation to FIG. 2 until the receipt of the contention resolution acknowledgement 210. A second contention resolution phase is then provided in which the MS 110 then transmits a second contention resolution preamble 208, encoded by a signature randomly chosen from a set of 16 possible signatures.

The set of signatures could be different from that used for the first contention resolution preamble 208 (either by changing the physical channel or the modulating bit sequence), or a single set of signatures could be shared between first and second contention resolution preambles 208. The first and second sets of contention preambles 208 and acknowledgements 210 could also be distinguished in some other way, for example by using different time offsets with respect to some defined time slot structure. Alternatively the system could be controlled so that an access acknowledgement 206 cannot be transmitted at the same time as a first contention resolution acknowledgement 210, thereby ensuring that the first and second contention resolution phases cannot occur simultaneously.

If an acknowledgement 210 of this second preamble 208 is also sent the BS 100 begins transmission of a PCCH 212 and the MS 110 begins transmission of its data packets in the same way as described above in relation to FIG. 2.

By use of this method a system in accordance with the present invention achieves a factor of 16 improvement in the contention failure rate. Although the access time is increased slightly by the second contention resolution phase, this increase is more than offset by the improved system throughput resulting from better contention resolution.

To obtain the same overall reliability as with a single contention resolution phase, it is could also be desirable to slightly increase the transmission power of the various preambles 208 to compensate for the increased time taken for contention resolution. This results in slightly increased interference levels in the uplink 124 and downlink 122 channels, but this is more than offset by the improved performance.

In a system in accordance with the present invention, it may not always be necessary to have two contention resolution phases. For example, if the system is lightly loaded one phase may be sufficient. In such a system the number of contention resolution phases could be signalled by the BS 100 on a broadcast channel. In a system where the choice of access preamble 202 is related to the resource requested by the MS 110, different resources could have different traffic loadings. Hence it could be defined that some choices of access preamble 202 required two contention resolution phases while others required just one. This definition could either be predetermined or made dependent on traffic loading and signalled by the BS 100 on a broadcast channel. If required more than two contention resolution phases could be used, but in practice two phases, as described above, is likely to be sufficient.

As well as its application in a FDD system as described above, the present invention could be applied in other types of communication system. For example, it could be used in a Time Division Multiple Access (TDMA) system provided that the uplink transmissions take place in different time slots to the downlink transmissions.

Figure 4:
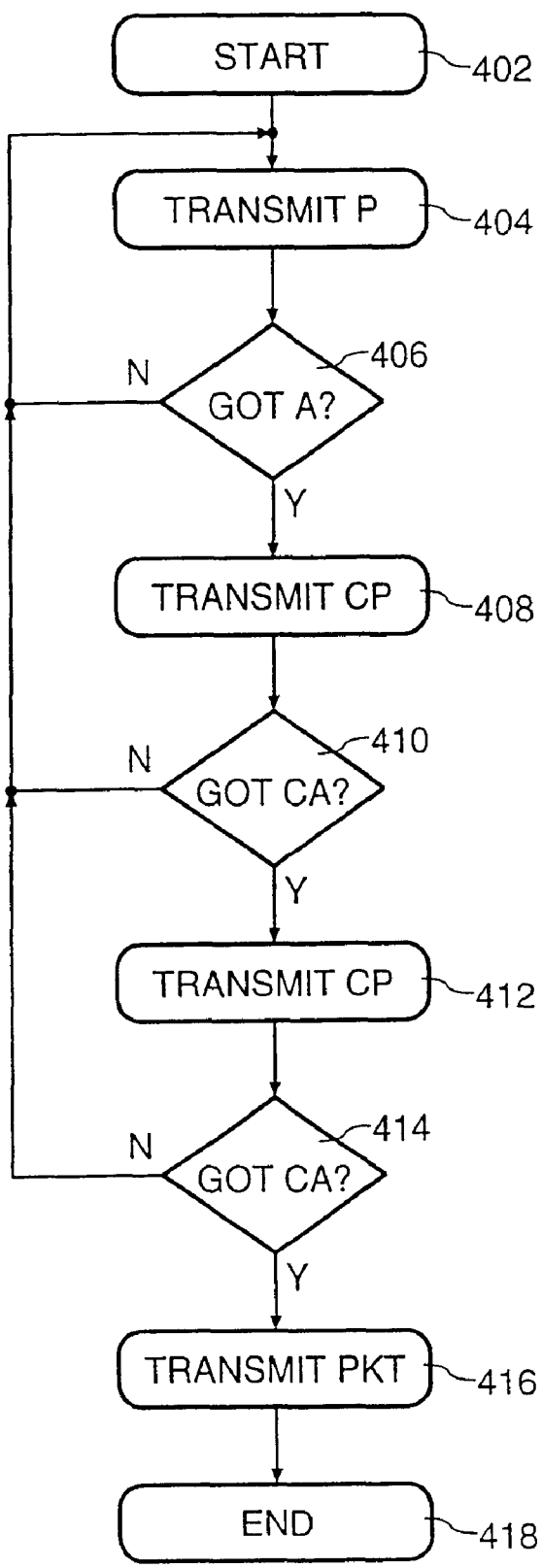
FIG. 4 is a flow chart illustrating a method in accordance with the present invention for improved contention resolution.

A flow chart summarising a method in accordance with the present invention for improved contention resolution is shown in FIG. 4. The method starts, at 402, with a MS 110 having data for transmission on the random access packet channel. The MS 110 transmits, at 404, an access preamble 202 then determines, at 406, if an acknowledgement 206 was transmitted by the BS 100. If not, the method returns to step 404 and transmits another preamble 202 at a higher power level. If an acknowledgement 206 is received, the MS 110 then, at 408, transmits a first contention resolution preamble 208. If the MS 110 determines, at step 410, that a contention resolution acknowledgement 210 was transmitted by the BS 110 it then transmits, at 412, a further preamble 208. If it determines, at step 414, that the BS 100 transmitted a further acknowledgement 210, the MS 110 is now able to proceed to transmit, at 416, its data packets 214, after which the method ends at 418.

If the MS 110 determines at either of steps 410 or 414 that the BS 100 did not transmit an acknowledgement 210, the method returns to the initial step 404 of transmitting an access preamble 202. The transmission power chosen for this preamble 202 may be the standard low initial power level, or preferably the same power as the original preamble 202 that appeared to be acknowledged by the BS 100. A back-off period may be required before a new access attempt can be made.

Some of the signatures used by the BS 100 for acknowledgement may also be used as a negative acknowledgement (NACK), indicating that a signal was received but that it cannot be processed for some reason. One other way of indicating a NACK is to invert the phase of the signature (with respect to some reference or pilot signal). The MS 110 may be required to wait for a back-off period before attempting access again.

The embodiments described above relate to packet transmission. However, the same principles can equally well be applied to a system in which circuits are set up for data transmission.

From reading the present disclosure, other modifications will be apparent to persons skilled in the art. Such modifications may involve other features which are already known in the design, manufacture and use of radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A radio communication system, comprising:
   a primary station;
   a plurality of secondary stations;
   wherein said primary station and a first secondary station are operable to engage in an access phase involving a request from said first secondary station to said primary station for access to a random access channel; and
   wherein, irrespective of a potential collision among said secondary stations regarding a transmission of data on the random access channel, said primary station and said first secondary station are further operable to engage in at least two contention resolution phases subsequent to a completion of the access phase, each contention resolution phase involving the request from said first secondary station to said primary station for access to the random access channel.

2. The radio communication system of claim 1,
   wherein said first secondary station is farther operable to select an access signature from a first set of signatures and to transmit an access preamble encoded with the access signature to said primary station during the access phase; and
   wherein said first secondary station is further operable to select a conditional resolution signature from a second set of signatures and to transmit a conditional resolution preamble encoded with the conditional resolution signature to said primary station during a first contention resolution phase.

3. The radio communication system of claim 1,
   wherein said first secondary station is further operable to select an access signature from a first set of signatures and to transmit an access preamble encoded with the access signature to said primary station during the access phase; and
   wherein said first secondary station is further operable to select a conditional resolution signature from the first set of signatures and to transmit a conditional resolution preamble encoded with the conditional resolution signature to said primary station during a first contention resolution phase.

4. The radio communication system of claim 1, wherein said first secondary station is further operable to select a first conditional resolution signature from a first set of signatures and to transmit a first conditional resolution preamble encoded with the first conditional resolution signature to said primary station during a first contention resolution phase; and wherein said first secondary station is further operable to select a second conditional resolution signature from a second set of signatures and to transmit a second conditional resolution preamble encoded with the second conditional resolution signature to said primary station during a second contention resolution phase.

5. The radio communication system of claim 1, wherein said first secondary station is further operable to select a first conditional resolution signature from a fist set of signatures and to transmit a first conditional resolution preamble encoded with the first conditional resolution signature to said primary station during a first contention resolution phase; and wherein said first secondary station is further operable to select a second conditional resolution signature from the first set of signatures and to transmit a second conditional resolution preamble encoded with the second conditional resolution signature to said primary station during a second contention resolution phase.

6. The radio communication system of claim 1, wherein said primary station and said first secondary station unconditionally engage in an initial contention resolution phase; and wherein said primary station and said first secondary station conditionally engage in any contention resolution phase subsequent contention resolution phase.

7. A primary station, comprising:

a microcontroller operable to engage said primary station in an access phase involving a request from a first secondary station for access to a random access channel,
   wherein, irrespective of a potential collision involving the first secondary station regarding a transmission of data on the random access channel said microcontroller is further operable to engage said primary station in at least two contention resolution phases subsequent to a completion of the access phase, each contention resolution phase involving the request from said first secondary station to said primary station for access to the random access channel; and a transceiver in electrical communication with said microcontroller to facilitate communications among said primary station and the first secondary station during the access phase and the at least two contention resolution phases.

8. The primary station of claim 7, wherein said microcontroller unconditionally engages said primary station in an initial contention resolution phase; and wherein said microcontroller conditionally engages said primary station in any contention resolution phase subsequent to the initial contention resolution phase.

9. A secondary station, comprising:

a microcontroller operable to engage said secondary station in an access phase involving a request from said secondary station to a primary station for access to a random access channel,
   wherein, irrespective of a potential collision involving said secondary station regarding a transmission of data on the random access channel, said microcontroller is further operable to engage said secondary station in at least two contention resolution phases subsequent to a completion of the access phase, each contention resolution phase involving the request from said first secondary station to said primary station for access to the random access channel; and a transceiver in electrical communication with said microcontroller to facilitate communications among said secondary station and the primary station during the access phase and the at least two contention resolution phases.

10. The secondary station of claim 9, wherein said microcontroller is further operable to select an access signature from a first set of signatures and to transmit an access preamble encoded with the access signature to said primary station during the access phase; and wherein said microcontroller is further operable to select a conditional resolution signature from a second set of signatures and to transmit a conditional resolution preamble encoded with the conditional resolution signature to said primary station during a first contention resolution phase.

11. The secondary station of claim 9, wherein said microcontroller is further operable to select an access signature from a first set of signatures and to transmit an access preamble encoded with the access signature to said primary station during the access phase; and wherein said microcontroller is further operable to select a conditional resolution signature from the first set of signatures and to transmit a conditional resolution preamble encoded with the conditional resolution signature to said primary station during a first contention resolution phase.

12. The secondary station of claim 9, wherein said microcontroller is further operable to select a first conditional resolution signature from a first set of signatures and to transmit a first conditional resolution preamble encoded with the first conditional resolution signature to said primary station during a first contention resolution phase; and wherein said microcontroller is further operable to select a second conditional resolution signature from a second set of signatures and to transmit a second conditional resolution preamble encoded with the second conditional resolution signature to said primary station during a second contention resolution phase.

13. The secondary station of claim 9, wherein said microcontroller is further operable to select a first conditional resolution signature from a first set of signatures and to transmit a first conditional resolution preamble encoded with the first conditional resolution signature to said primary station during a first contention resolution phase; and wherein said microcontroller is further operable to select a second conditional resolution signature from the first set of signatures and to transmit a second conditional resolution preamble encoded with the second conditional resolution signature to said primary station during a second contention resolution phase.

14. The secondary station of claim 9, wherein said microcontroller unconditionally engages said secondary station in an initial contention resolution phase; and wherein said microcontroller conditionally engages said secondary station in any contention resolution phase subsequent to the initial contention resolution phase.

15. A method of operating a radio communication system including a primary station and a plurality of secondary stations, the method comprising:

operating the primary station and a first secondary station to engage in an access phase involving a request from the first secondary station to the primary station for access to a random access channel; and irrespective of a potential collision among the plurality of secondary stations regarding a transmission of data on the random access channel, operating the primary station and the first secondary station to engage in at least two contention resolution phases subsequent to a completion of the access phase, each contention resolution phase involving the request from said first secondary station to said primary station for access to the random access channel.

16. The method of claim 15, operating the first secondary station to select an access signature from a first set of signatures and to transmit an access preamble encoded with the access signature to the primary station during the access phase; and operating the first secondary station to select a condition resolution signature from a second set of signatures and to transmit a condition resolution preamble encoded with the condition resolution signature to the primary station during a first condition resolution phase.

17. The method of claim 15, operating the first secondary station to select an access signature from a first set of signatures and to transmit an access preamble encoded with the access signature to the primary station during the access phase; and operating the first secondary station to select a condition resolution signature from the first set of signatures and to transmit a condition resolution preamble encoded with the condition resolution signature to the primary station during a first condition resolution phase.

18. The method of claim 15, operating the first secondary station to select a first condition resolution signature from a first set of signatures and to transmit a first condition resolution preamble encoded with the first condition resolution signature to the primary station during a first condition resolution phase; and operating the first secondary station to select a second condition resolution signature from a second set of signatures and to transmit a second condition resolution preamble encoded with the second condition resolution signature to the primary station during a second condition resolution phase.

19. The method of claim 15, operating the first secondary station to select a first condition resolution signature from a first set of signatures and to transmit a first condition resolution preamble encoded with the first condition resolution signature to the primary station during a first condition resolution phase; and operating the first secondary station to select a second condition resolution signature from the first set of signatures and to transmit a second condition resolution preamble encoded with the second condition resolution signature to the primary station during a second condition resolution phase.

20. The method of claim 15, wherein the primary station and the first secondary station unconditionally engage in an initial contention resolution phase; and wherein the primary station and the first secondary station conditionally engage in any contention resolution phase subsequent to the initial contention resolution phase.

* * * * *